US008400660B2

(12) United States Patent
Numata (10) Patent No.: US 8,400,660 B2
(45) Date of Patent: Mar. 19, 2013

(54) INFORMATION PROCESSING DEVICE, INFORMATION PROCESSING METHOD, COMPUTER READABLE MEDIUM, AND COMPUTER DATA SIGNAL EMBODIED IN A CARRIER WAVE

(75) Inventor: Tetsuo Numata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 475 days.

(21) Appl. No.: 12/618,947

(22) Filed: Nov. 16, 2009

(65) Prior Publication Data

US 2010/0315669 A1 Dec. 16, 2010

(30) Foreign Application Priority Data

Jun. 10, 2009 (JP) ................... 2009-138925

(51) Int. Cl.
*G06F 3/12* (2006.01)
*G06K 15/00* (2006.01)
*G06K 9/54* (2006.01)
*G06K 9/60* (2006.01)
*G06F 3/00* (2006.01)
*G06F 13/00* (2006.01)
*G06G 5/00* (2006.01)

(52) U.S. Cl. ..................... 358/1.15; 358/1.16; 358/1.17; 358/1.13; 358/1.9; 710/1; 710/5; 710/33; 710/52; 382/305

(58) Field of Classification Search ........................ None
See application file for complete search history.

(56) References Cited

U.S. PATENT DOCUMENTS

| 6,178,273 | B1 * | 1/2001 | Kuga | 382/305 |
|---|---|---|---|---|
| 6,854,020 | B1 * | 2/2005 | Kamihara et al. | 710/1 |
| 2005/0027825 | A1 * | 2/2005 | Hikawa et al. | 709/219 |
| 2005/0086557 | A1 * | 4/2005 | Sato et al. | 714/6 |
| 2009/0195821 | A1 * | 8/2009 | Matoba | 358/1.15 |
| 2009/0257771 | A1 * | 10/2009 | Takesada | 399/79 |
| 2012/0062949 | A1 * | 3/2012 | Sochi | 358/1.15 |
| 2012/0069362 | A1 * | 3/2012 | Konno | 358/1.9 |
| 2012/0069363 | A1 * | 3/2012 | Nohdomi | 358/1.9 |
| 2012/0069402 | A1 * | 3/2012 | Konno | 358/1.16 |

FOREIGN PATENT DOCUMENTS

| JP | 06-147185 A | 5/1994 |
|---|---|---|
| JP | 7-334572 A | 12/1995 |
| JP | 2005-190366 A | 7/2005 |
| JP | 2005-192106 A | 7/2005 |

* cited by examiner

*Primary Examiner* — Satwant Singh
(74) *Attorney, Agent, or Firm* — Sughrue Mion, PLLC (57) ABSTRACT

An information processing device includes a memory that stores instruction data describing a content of processing to be executed on document data and a sequence of the processing, in association with a storing area for storing the document data; and a processing executing unit that executes a first processing on the document data stored in the storing area according to the instruction data associated with the storing area, when the document data is stored in the storing area, and executes a second processing on the document data according to the instruction data set for an upper storing area when the upper storing area is set for the storing area.

8 Claims, 8 Drawing Sheets

CONTENTS OF INSTRUCTION DATA STORED IN "REQUEST FOR MANAGERIAL DECISION" DOCUMENT BOX 80

- ENCRYPTION PROCESSING
- ATTACHING SIGNATURE TO APPLICATION
- TRANSMITTING MAIL TO AUDITOR
- STORING DATA CONVERTED IN PDF FORMAT, INTO APPROVAL SERVER

FIG.6B

CONTENTS OF INSTRUCTION DATA STORED IN "REQUEST FOR MANAGERIAL DECISION IN PERSONNEL DEPARTMENT" DOCUMENT BOX 81

- TRANSMITTING MAIL TO AUDITOR IN PERSONNEL DEPARTMENT
- ADDINGDIGITAL WATERMARK INDICATING PERSONNEL DEPARTMENT
- PRINTING COPY FOR APPLICANT'S KEEPING

FIG.8

INFORMATION PROCESSING DEVICE, INFORMATION PROCESSING METHOD, COMPUTER READABLE MEDIUM, AND COMPUTER DATA SIGNAL EMBODIED IN A CARRIER WAVE

CROSS-REFERENCE TO RELATED APPLICATIONS

This application is based on and claims priority under 35 USC 119 from Japanese Patent Application No. 2009-138925 filed Jun. 10, 2009.

BACKGROUND ART

Technical Field

The invention relates to an information processing device, an information processing method, a computer readable medium, and a computer data signal embodied in a carrier wave.

SUMMARY

According to a first aspect of the invention, there is provided an information processing device including: a memory that stores instruction data describing a content of processing to be executed on document data and a sequence of the processing, in association with a storing area for storing the document data; and a processing executing unit that executes a first processing on the document data stored in the storing area according to the instruction data associated with the storing area, when the document data is stored in the storing area, and executes a second processing on the document data according to the instruction data set for an upper storing area when the upper storing area is set for the storing area.

BRIEF DESCRIPTION OF THE DRAWINGS

Exemplary embodiments of the present invention will be described in detail based on the following figures, wherein.

DETAILED DESCRIPTION

Figure 1:
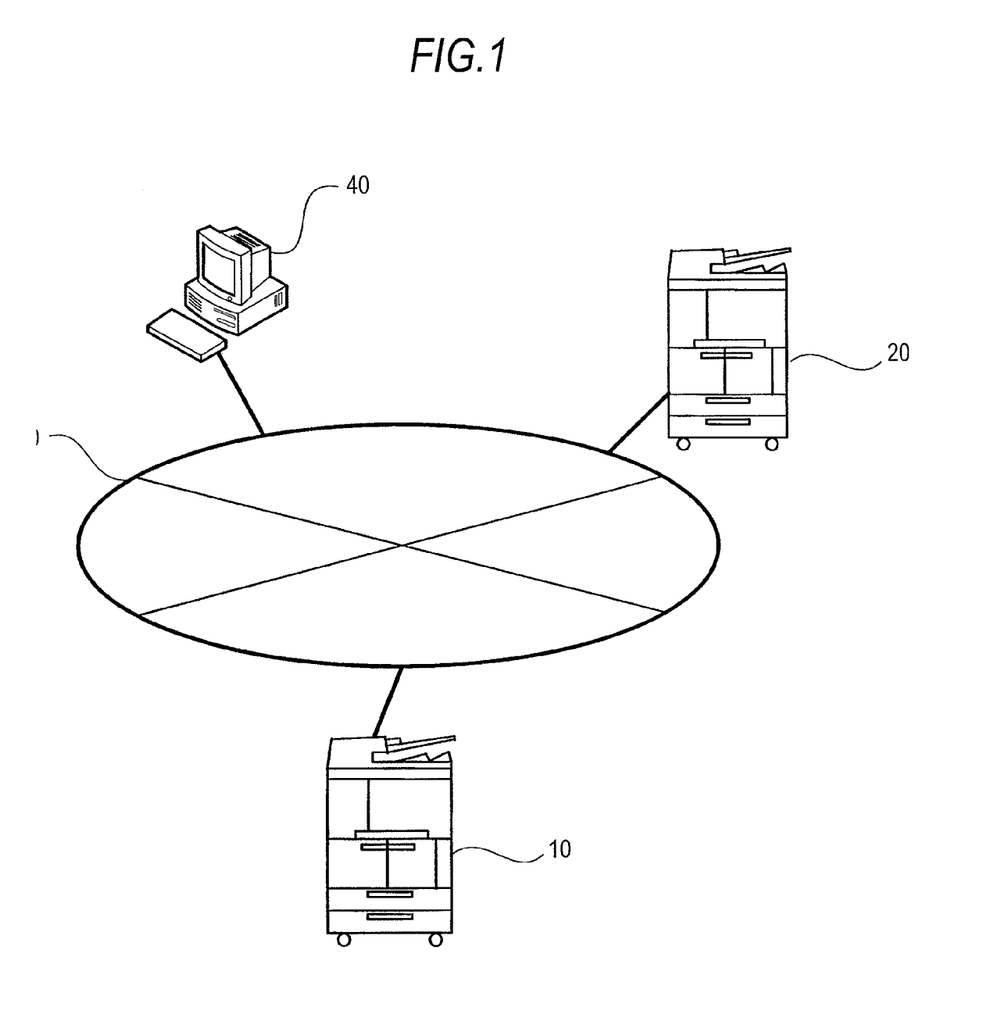
FIG. 1 is a view showing the structure of an image forming system, according to an exemplary embodiment of the invention.

An exemplary embodiment of the invention will be described in detail with reference to the drawings. FIG. 1 is a block diagram showing the structure of an image forming system, according to the exemplary embodiment of the invention.

The image forming system according to the exemplary embodiment of the invention has image forming devices 10 and 20 and a terminal device 40 mutually connected through a network 30, as illustrated in FIG. 1. The terminal device 40 creates print data and transmits the created print data to the image forming devices 10 and 20 through the network 30. The image forming devices 10 and 20 receive the print data transmitted from the terminal device 40 and output the image corresponding to the print data on the paper. Here, the image forming devices 10 and 20 are so-called multifunction printers including a plurality of functions such as printing (print) function, scanning function, copying (copy) function, and facsimile function.

Figure 2:
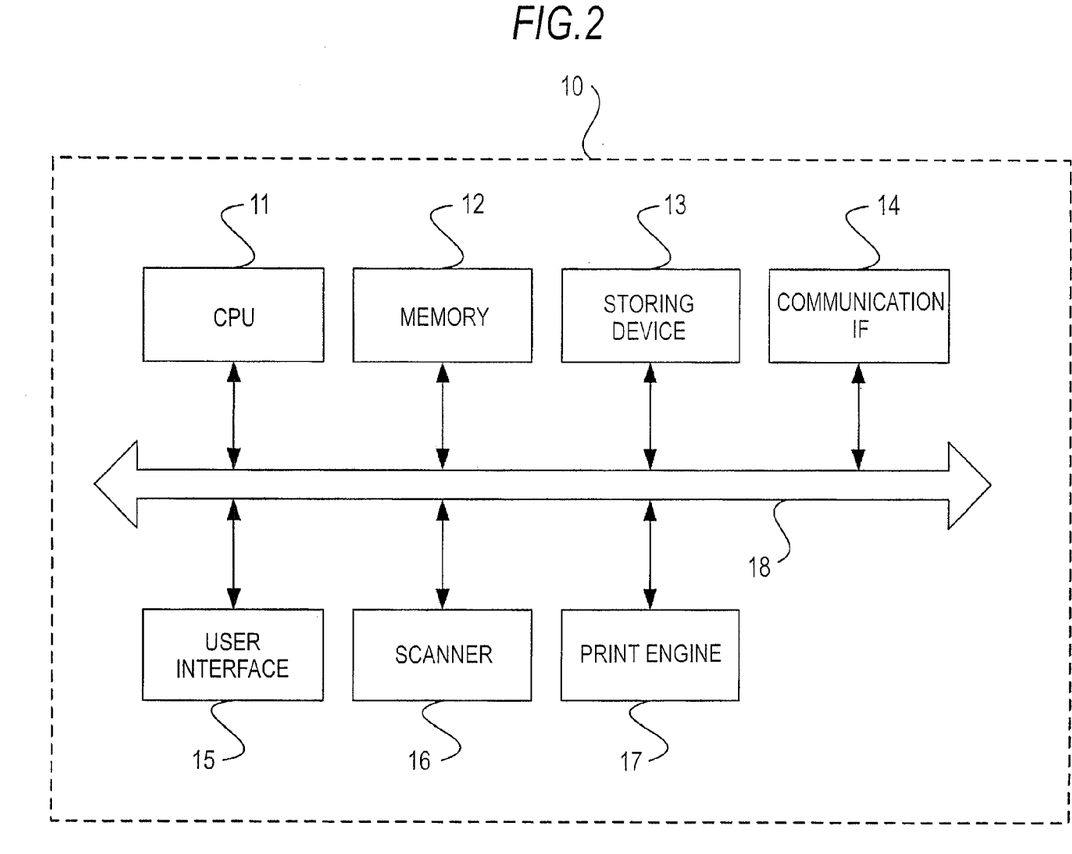
FIG. 2 is a block diagram showing the hardware structure of an image forming device, according to the exemplary embodiment of the invention.

The hardware structure of the image forming device 10 in the image forming system of this exemplary embodiment is illustrated in FIG. 2. Since the structure of the image forming device 20 is the same as that of the image forming device 10, its description is omitted.

The image forming device 10 includes a CPU 11, a memory 12, a storing device 13 such as hard disk drive (HDD), a communication interface (IF) 14 for transmitting and receiving data to and from the external device through the network 30, a user interface (UI) 15 including a touch panel or liquid crystal display and a keyboard, a scanner 16, and a print engine 17, as illustrated in FIG. 2. These components are mutually connected to each other through a control bus 18.

The CPU 11 performs predetermined processing according to a control program stored in the memory 12 or the storing device 13, hence to control the operation of the image forming device 10.

Although in this exemplary embodiment, the CPU 11 reads out and executes the control program stored in the memory 12 or the storing device 13, the above program may be stored in a storing medium such as CD-ROM and it may be provided to the CPU 11.

Figure 3:
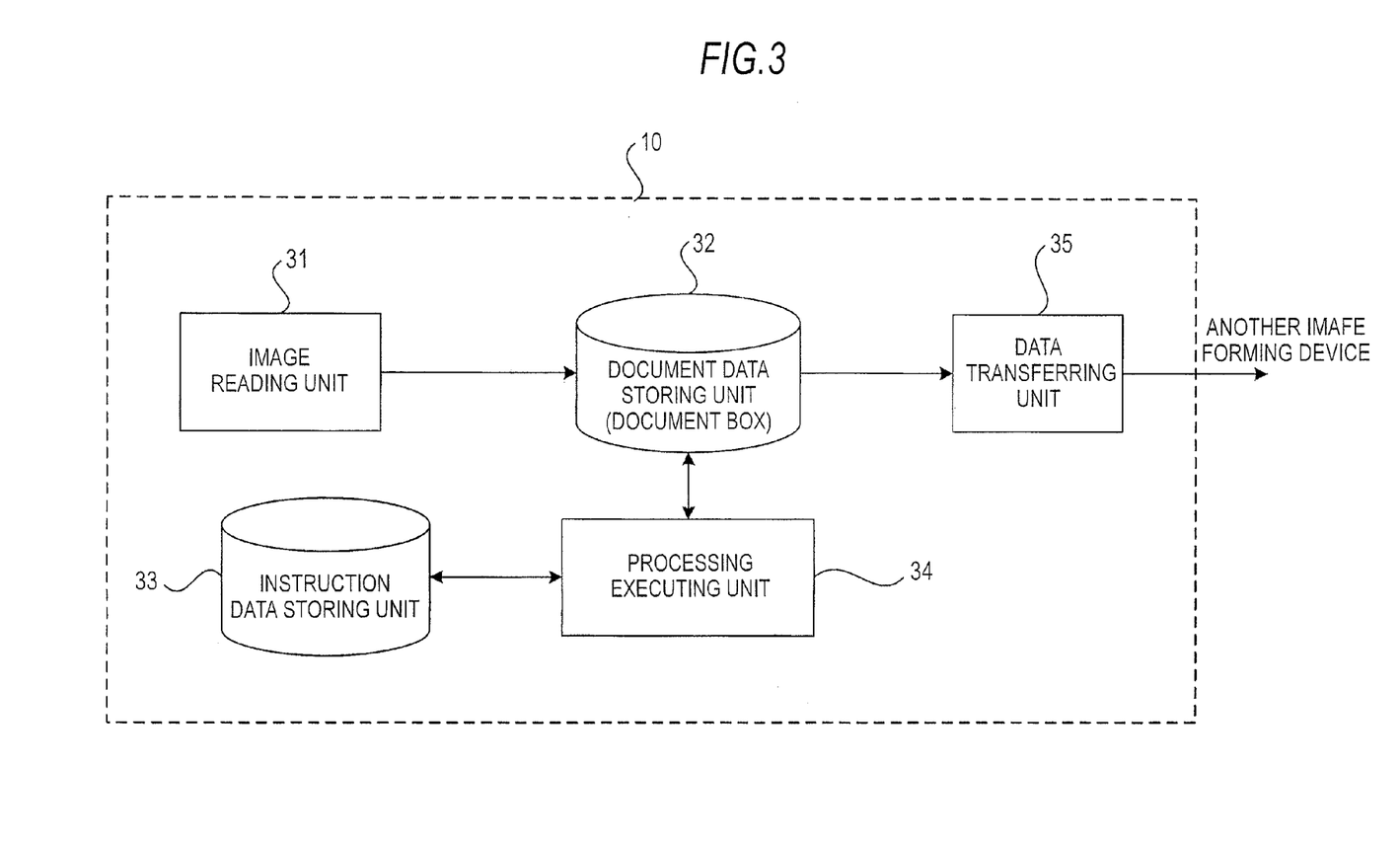
FIG. 3 is a block diagram showing the functional structure of the image forming device, according to the exemplary embodiment of the invention.

FIG. 3 is a block diagram showing the functional structure of the image forming device 10 which is realized by executing the above control program.

The image forming device 10 of this exemplary embodiment includes an image reading unit 31, a document data storing unit 32, an instruction data storing unit 33, a processing executing unit 34, and a data transferring unit 35, as illustrated in FIG. 3.

A plurality of document boxes that are storing areas for storing document data, are set in the document data storing unit 32. The document data storing unit 32 stores document data in the respective document boxes.

The image reading unit 31 reads the document image and stores it in a specified document box, of the document boxes of the document data storing unit 32, as the document data.

The instruction data storing unit 33 stores the instruction data (instructions) describing the contents of the processing to be performed on the document data and the sequence of the processing, in association with the document box.

When document data is stored in a document box, the processing executing unit 34 executes the processing on the document data stored in the document box, according to the instruction data related to the document box and when an upper document box is set for the document box, it executes the processing on the above document data according to the instruction data set in the upper document box.

When a plurality of upper document boxes is set for the document box with the processed document data stored, the processing executing unit 34 executes the respective processing on the above document data, according to the instruction data set in the upper document boxes.

When the upper document box set for the document box is provided in another image forming device, the data transferring unit 35 transfers the document data processed by the processing executing unit 34 to the upper document box of the other image forming device. For example, when the upper document box of the document box provided in the image forming device 10, is provided in the image forming device 20, the data transferring unit 35 transfers the document data to the document box of the image forming device 20, after the processing is performed on the above data according to the instruction data set in the document box provided in the image forming device 10.

Next, the operation of the image forming system according to this exemplary embodiment will be described in detail with reference to the drawings.

Figure 4:
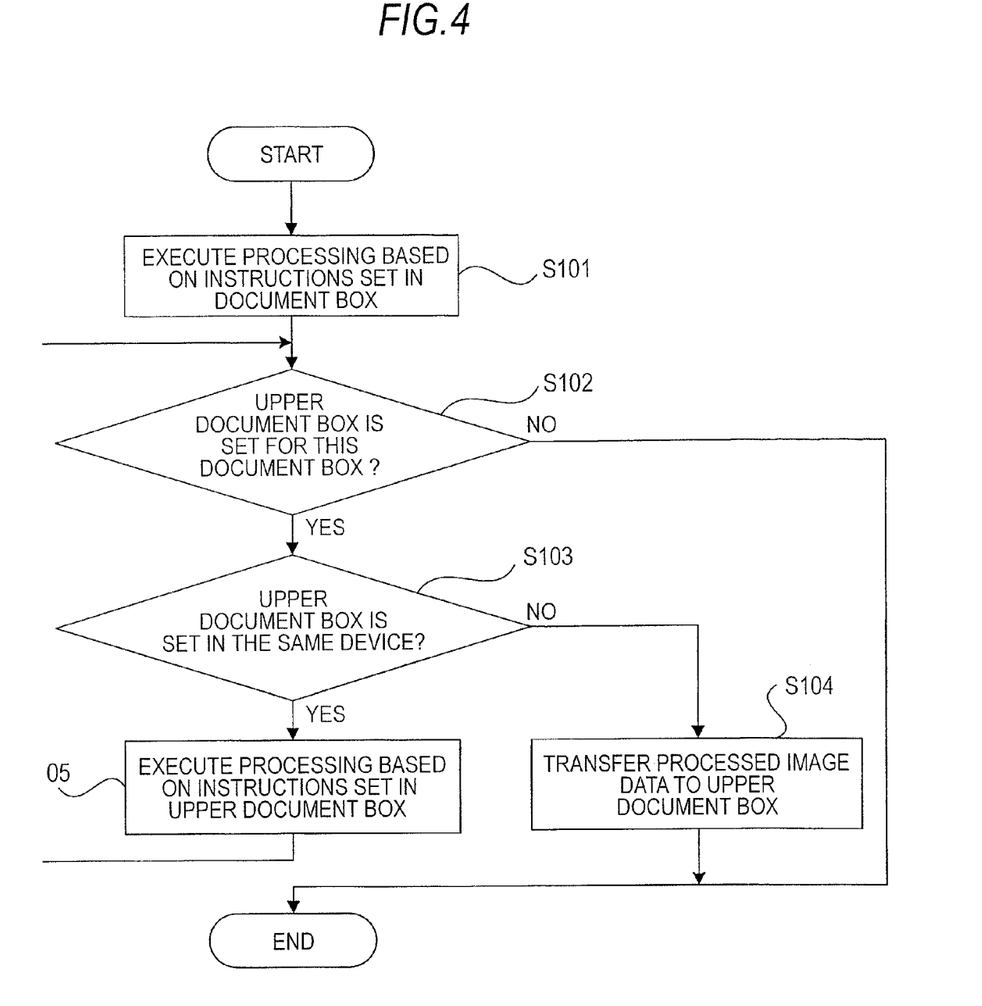
FIG. 4 is a flow chart showing the operation of the image forming device, according to the exemplary embodiment of the invention.

The operation of the image forming device 10 according to this exemplary embodiment will be described with reference to the flow chart of FIG. 4.

When the image reading unit 31 reads the document image and stores it as the document data in the document box of the document data storing unit 32, the processing executing unit 34 performs the processing on the document data according to the instruction data (instructions) set in the document box with the document data stored, with reference to the instruction data storing unit 33 (Step S101).

It is checked whether an upper document box is set for the document box where the document data is first stored (Step S102). When the upper document box is set for the document box where the document data is first stored (Yes in Step S102), it is checked whether the upper document box is provided in the same device (Step S103). When the upper document box is not provided in the same device (No in Step S103), the document data which has been processed by the processing executing unit 34 is transferred to the document box of the other device which is set as the upper document box by the data transferring unit (Step S104).

When the upper document box is provided in the same device (Yes in Step S103), the processing executing unit 34 stores the document data which has been subjected to the first processing, in the upper document box and sequentially performs the processing based on the instruction data (instructions) set in the above upper document box (Step S105).

After the processing is performed, it is checked whether the further upper document box is set for this upper document box (Step S102). The same processing will be repeated until there is no further upper document box.

Figure 5:
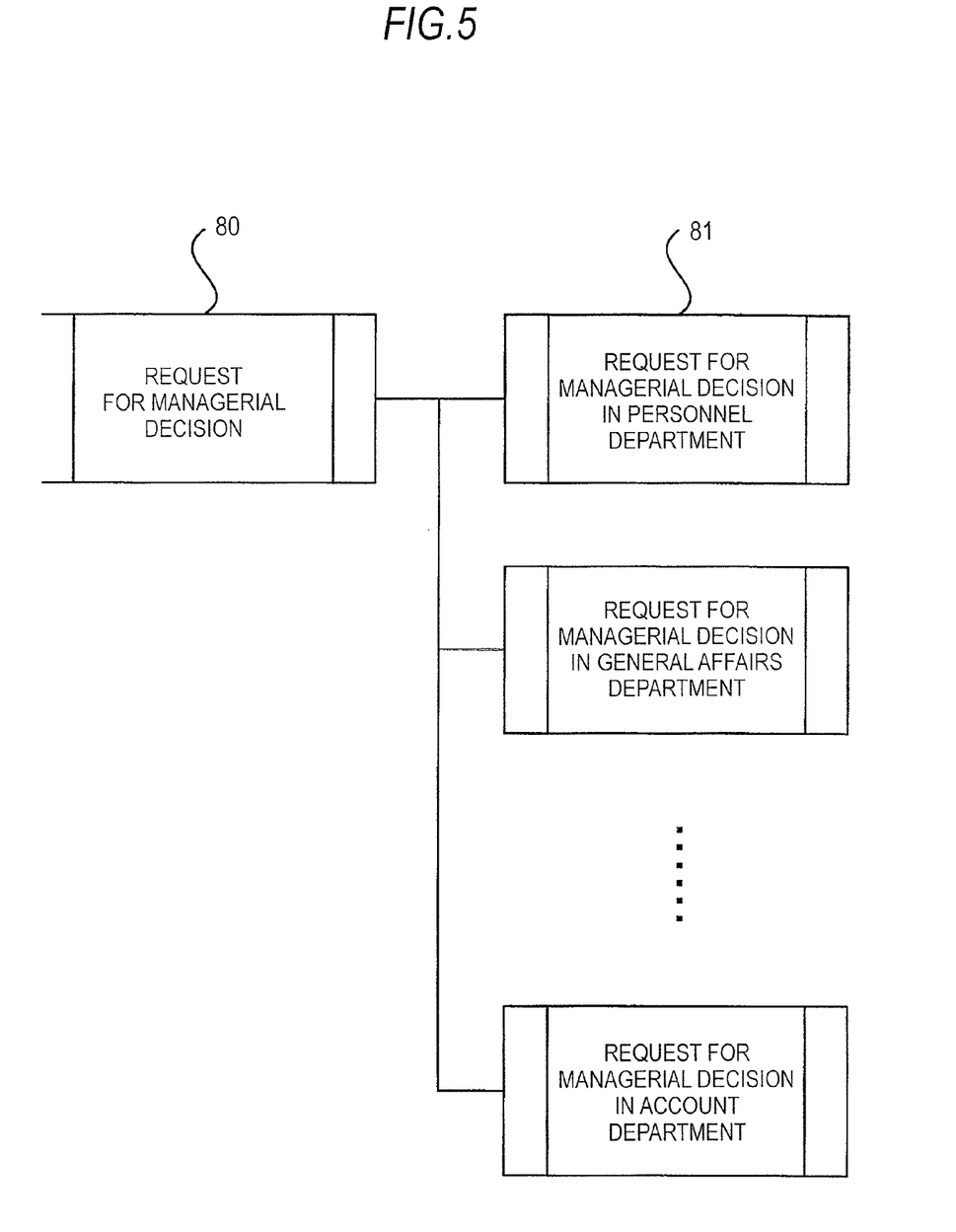
FIG. 5 is a view showing one example of a document box with a hierarchy.
Figure 6A:
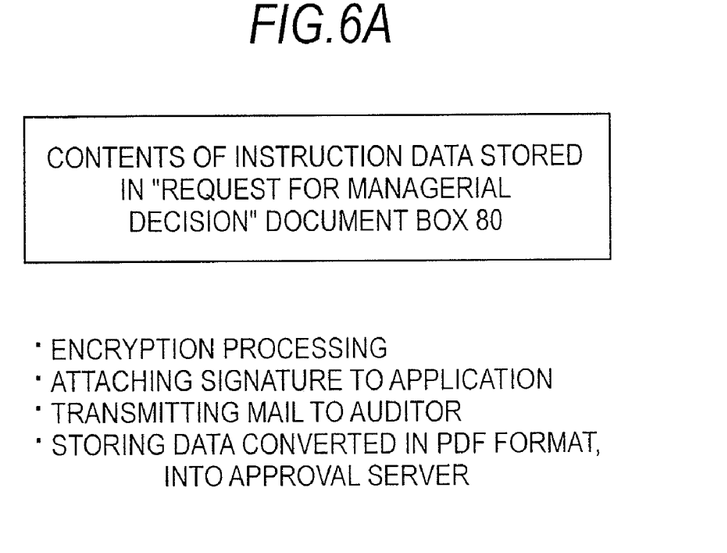
FIGS. 6A and 6B are views for use in describing the contents of instruction data set in the document boxes illustrated in FIG. 5, respectively.
Figure 6B:
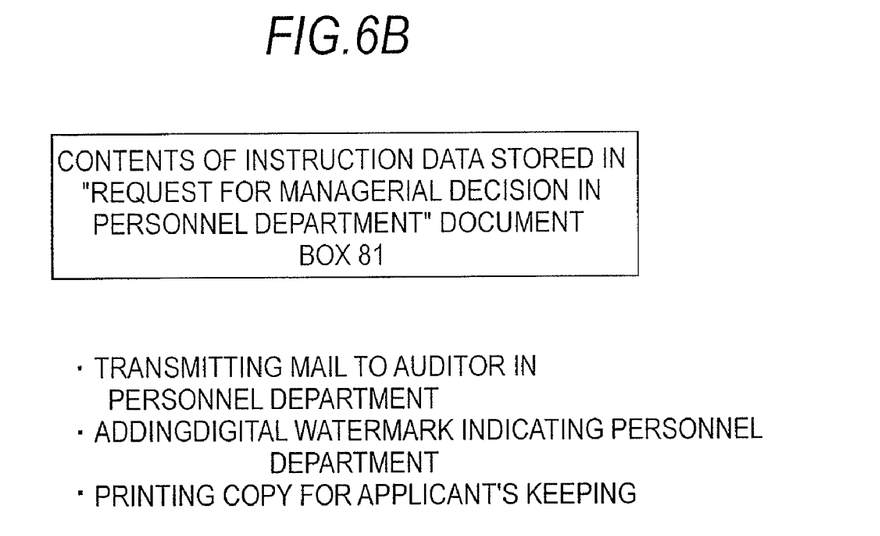

The operation of the image forming device 10 according to this exemplary embodiment will be described with reference to a specific example. For example, as illustrated in FIG. 5, it will be described taking an example of a document box 81 "request for managerial decision in personnel department" having an upper document box 80 "request for managerial decision". Assuming that the document box 80 "request for managerial decision" includes the instruction data as illustrated in FIG. 6A and that the document box 81 "request for managerial decision in personnel department" includes the instruction data as illustrated in FIG. 6B, the description will be made.

Under this situation, when some document data is stored in the document box 81 "request for managerial decision in personnel department", the processing executing unit 34 performs the processing previously registered in the document box 81, such as transmitting a mail to an auditor in the personnel department, adding a digital watermark indicating the personnel department, and printing a copy for applicant's keeping. Upon completion of a series of the processing, the processing executing unit 34 performs a series of the processing previously registered in the upper document box 80 "request for managerial decision" set above the document box 81, such as encryption processing, attaching signature to the application, transmitting the mail to an auditor, and storing data converted in PDF format into an approval server.

In FIG. 5, the description has been made when the two document boxes are defined as the upper and the lower one; however, three or more document boxes maybe used. For example, as illustrated in FIG. 7, the document box 82 "Fuji Taro's request for managerial decision" may be further set under the document box 81 "request for managerial decision in personnel department".

Figure 7:
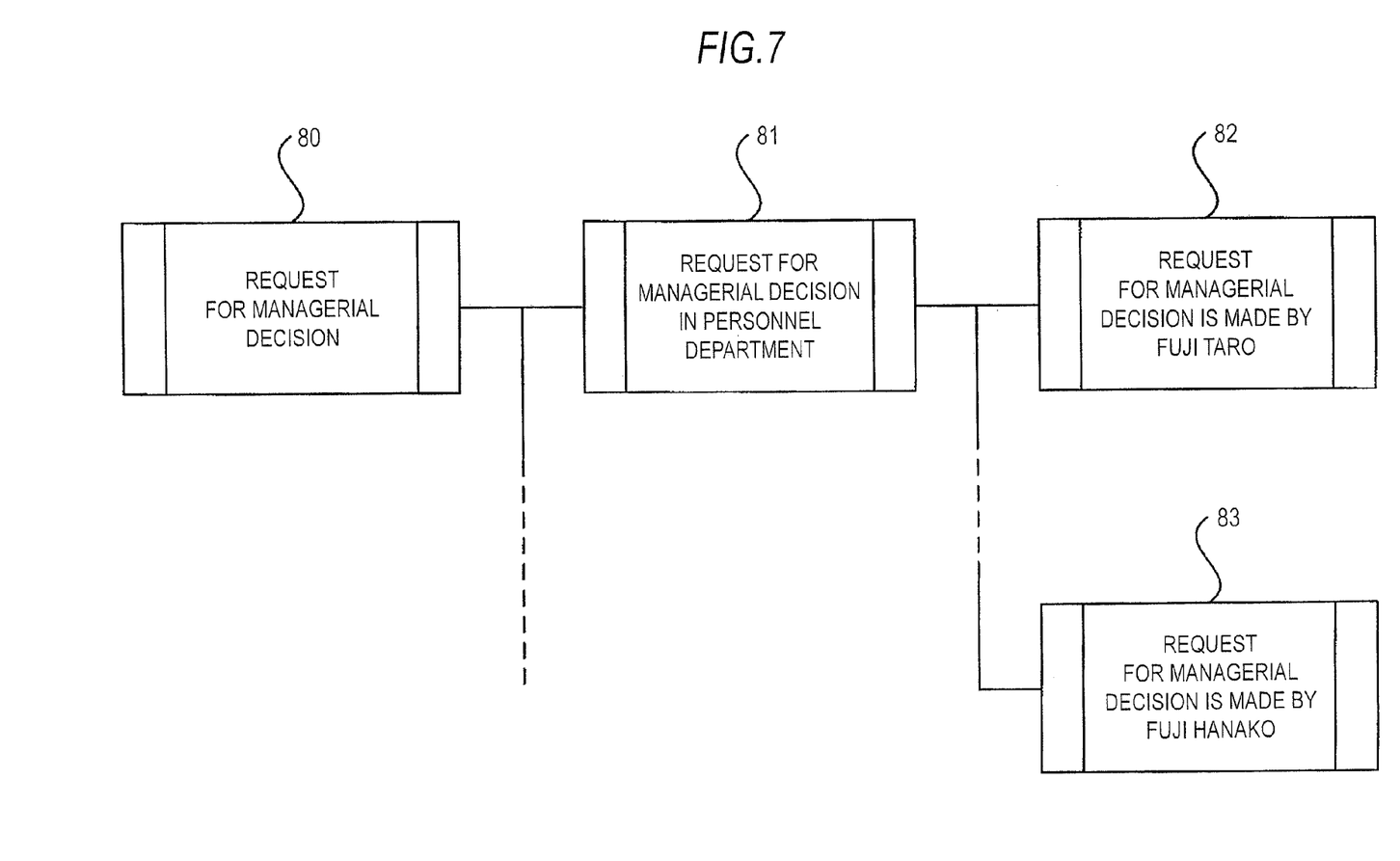
FIG. 7 is a view showing one example of the document boxes with a three-level hierarchy.

In the case as illustrated in FIG. 7, the document data stored in the document box 82 "Fuji Taro's request for managerial decision" is sequentially subjected to the processing based on the instruction data stored in the document box 82, the processing based on the instruction data stored in the document box 81, and the processing based on the instruction data stored in the document box 80.

Figure 8:
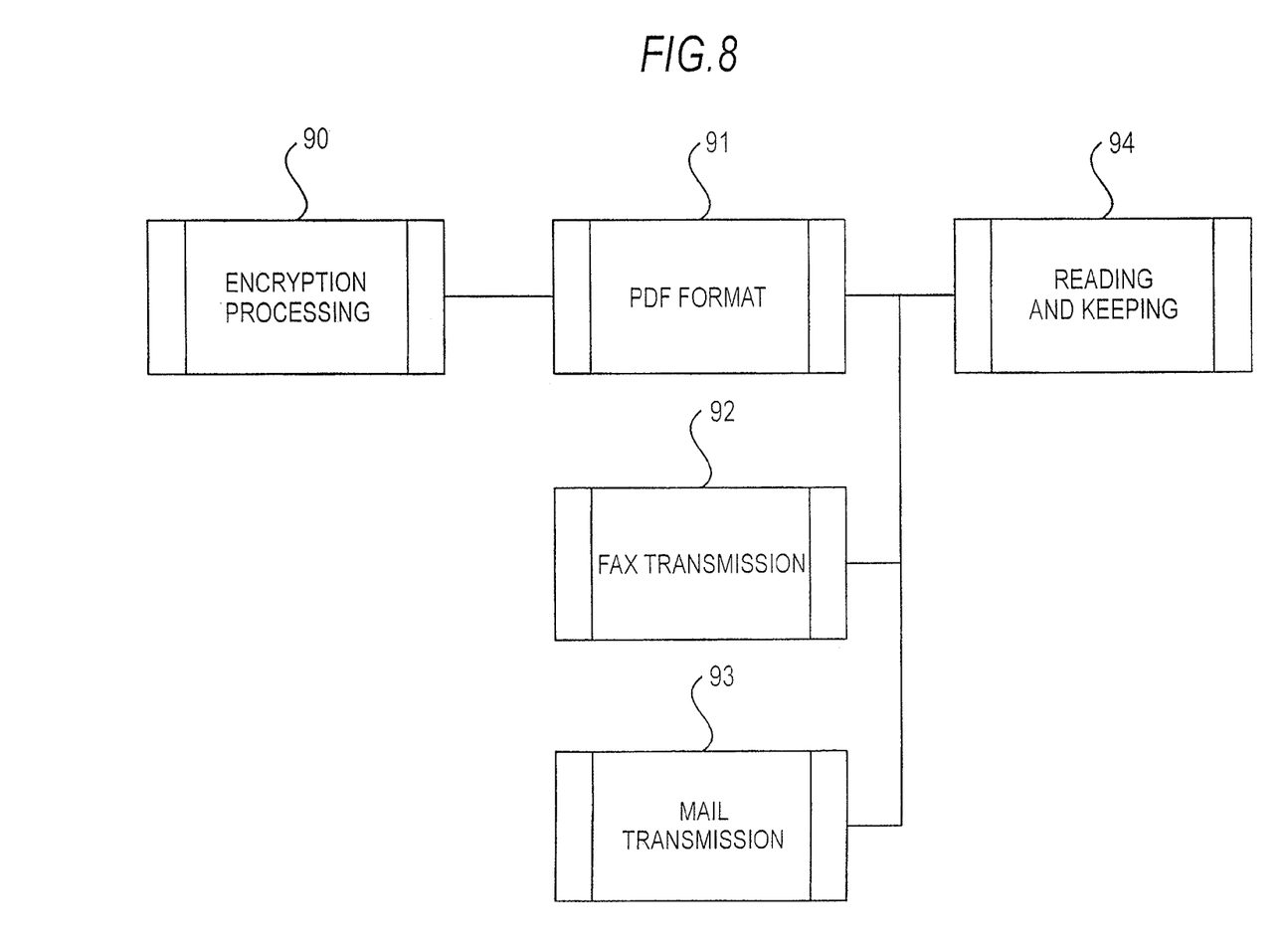
FIG. 8 is a view showing one example of one document box having a plurality of upper document boxes.

Further, it is possible to set a plurality of upper document boxes for one document box, as illustrated in FIG. 8. In the example illustrated in FIG. 8, three upper document boxes 91 to 93 are set for a document box 94 "reading and keeping" and a further upper document box 90 is set for the document box 91 of the above three.

In this case as illustrated in FIG. 8, the document data stored in the document box 94 "reading and keeping" is subjected to the processing based on the instruction data stored in the document box 91, the processing based on the instruction data stored in the document box 92, and the processing based on the instruction data stored in the document box 93, in parallel. Then, the document data processed according to the instruction data stored in the document box 91 is further subjected to the processing based on the instruction data stored in the document box 90.

VARIATION EXAMPLE

Although the above exemplary embodiment has been described when the invention is adopted to the image forming device such as a printer, the invention is not restricted to this. It can be adopted to another information processing device in which document data is stored in a storing area like the document box and the processing to be executed is assigned to every storing area.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An information processing device, comprising:
a memory that stores instruction data describing a content of processing to be executed on document data and a sequence of the processing, in association with a storing area for storing the document data;
a processing executing unit that executes a first processing according to the instruction on the document data stored in the storing area according to the instruction data associated with the storing area, when the document data is stored in the storing area, and executes a second processing according to the instruction on the document data according to the instruction data set for an upper storing area when the upper storing area is set for the storing area; and a transferring unit that transfers the document data which has been processed by the processing executing unit to an upper storing area of another information processing device wherein the upper storing area set for the storing area is provided in the another information processing device.

2. The information processing device according to claim 1, wherein when a plurality of upper storing areas are set for the storing area in which the document data is stored, the processing executing unit executes respective processing on the document data according to respective instruction data set in the upper storing areas.

3. An information processing method, comprising:

executing a first processing according to the instruction on document data stored in a storing area according to instruction data associated with the storing area, when the document data is stored in the storing area, the instruction data describing a contents of processing to be executed on the document data and a sequence of the processing;

executing a second processing according to the instruction on the document data according to the instruction data set for an upper storing area, when the upper storing area is set for the storing area; and transferring the document data which has been processed to an upper storing area of another information processing device wherein the upper storing area set for the storing area is provided in the another information processing device.

4. The information processing method according to claim 3, wherein when a plurality of upper storing areas are set for the storing area in which the document data is stored, respective processing is executed on the document data according to respective instruction data set in the upper storing areas.

5. The information processing method according to claim 3, further comprising: transferring the document data on which has been processed to an upper storing area of another information processing device when the upper storing area set for the storing area is provided in the another information processing device.

6. A non-transitory computer readable medium storing a program causing a computer to execute a process for processing information, the process comprising:

executing a first processing according to the instruction on document data stored in a storing area according to instruction data associated with the storing area, when the document data is stored in the storing area, the instruction data describing a contents of processing to be executed on the document data and a sequence of the processing; and executing the processing according to the instruction on the above document data, according to the instruction data set for an upper storing area, when the upper storing area is set for the storing area; and transferring the document data which has been processed to an upper storing area of another information processing device wherein the upper storing area set for the storing area is provided in the another information processing device.

7. The computer readable medium according to claim 6, wherein when a plurality of upper storing areas are set for the storing area in which the document data is stored, respective processing is executed on the document data according to respective instruction data set in the upper storing areas.

8. The computer readable medium according to claim 6, further comprising: transferring the document data on which has been processed to an upper storing area of another information processing device when the upper storing area set for the storing area is provided in the another information processing device.

* * * * *